United States Patent [19]

Byerly et al.

[11] Patent Number: 4,898,302

[45] Date of Patent: Feb. 6, 1990

[54] APPARATUS FOR MELTING AND DISPENSING THERMOPLASTIC MATERIAL

[75] Inventors: David J. Byerly; Paul S. Frates, both of Lawrenceville; Charles H. Scholl, Duluth, all of Ga.

[73] Assignee: Nordson Corporation, Westlake, Ohio

[21] Appl. No.: 299,676

[22] Filed: Jan. 23, 1989

Related U.S. Application Data

[63] Continuation of Ser. No. 2,173, Jan. 12, 1987, abandoned.

[51] Int. Cl.⁴ .............................................. B67D 5/62
[52] U.S. Cl. ...................................... 222/49; 222/108; 222/146.5; 222/256; 222/327
[58] Field of Search ............... 222/146.5, 49, 108, 222/185, 256, 326, 327, 372, 386, 593; 219/430, 432, 433, 521

[56] References Cited

U.S. PATENT DOCUMENTS

| | | | |
|---|---|---|---|
| 2,593,362 | 4/1952 | Taylor | 222/326 |
| 2,665,823 | 1/1954 | Fossa | 222/146.5 X |
| 3,178,059 | 4/1965 | Packwood, Jr. | 222/256 X |
| 3,456,849 | 7/1969 | Sjostrand | 222/146.5 |
| 3,782,598 | 1/1974 | Basa | 222/49 |
| 3,792,801 | 2/1974 | Baker et al. | 222/146.5 |
| 3,876,105 | 4/1975 | Kelling | 222/146.5 X |
| 3,904,083 | 9/1975 | Little | 222/326 X |
| 3,964,645 | 6/1976 | Scholl | 222/146.5 |
| 4,200,207 | 4/1980 | Akers et al. | 222/190 |
| 4,308,447 | 12/1981 | Notzold et al. | 222/146.5 X |
| 4,547,657 | 10/1985 | Sticher, Jr. et al. | 219/492 |
| 4,586,636 | 5/1986 | Bauer et al. | 222/146.5 |
| 4,647,213 | 3/1987 | Hay, II | 222/108 X |

Primary Examiner—Kevin P. Shaver
Attorney, Agent, or Firm—Wood, Herron & Evans

[57] ABSTRACT

An apparatus for melting and dispensing rapidly degradable reactive adhesive such as moisture curable hot melt adhesive from a thermally conductive, sealed container includes a housing within which the container is supported in a position to engage a heated surface of a platen. The platen is mounted within the housing in fluid communication with a heated manifold carrying a gear pump. The platen melts the adhesive within the container and provides for the transfer of heat uniformly throughout the stream of melted adhesive discharged through the outlet of the container. The melted adhesive is transmitted from the platen into the gear pump in the manifold which is thermally isolated from the platen to maintain the adhesive therein at a substantially constant temperature. After the container is emptied, a drippage collection structure associated with the container support is pivoted beneath the outlet of the container to catch any residual adhesive and prevent spillage which might occur in the course of removing an empty container from the housing.

15 Claims, 4 Drawing Sheets

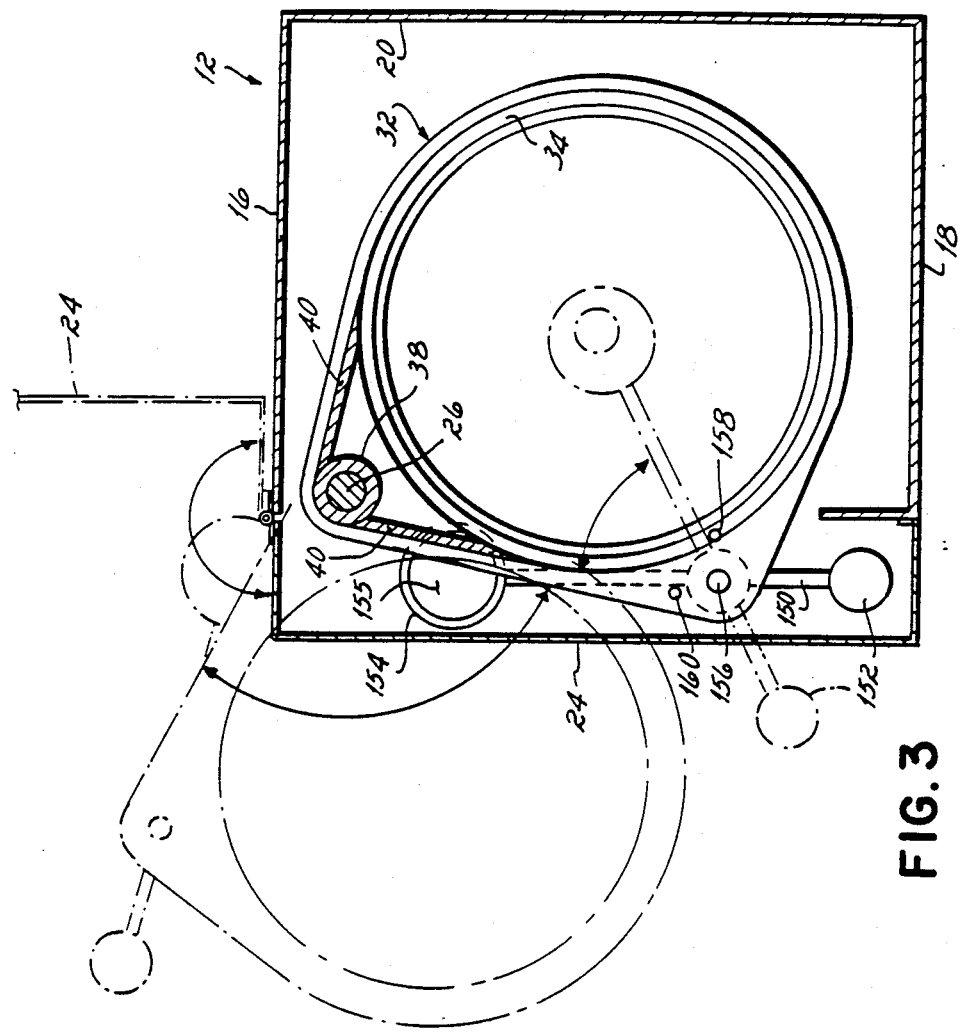
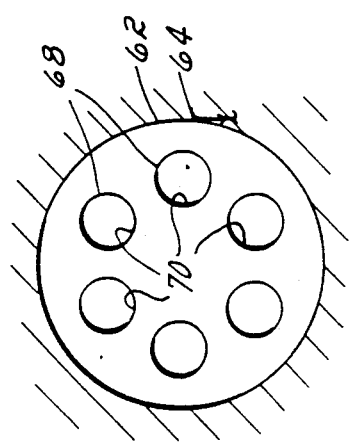
FIG. 3
FIG. 5

APPARATUS FOR MELTING AND DISPENSING THERMOPLASTIC MATERIAL

This is a continuation of application Ser. No. 002,173, filed Jan. 12, 1987, now abandoned.

BACKGROUND OF THE INVENTION

This invention is related to apparatus for melting and dispensing thermoplastic material, and, more particularly, to an apparatus for melting reactable moisture curable thermoplastic material within a moisture-proof, sealed container and discharging the molten thermoplastic material from the container to one or more adhesive dispensers.

Thermoplastic adhesives, or so-called hot melt adhesives, are commonly used in bonding a wide variety of materials. Hot melt adhesives have been employed in the assembly of packages, automobile parts, electrical equipment and a variety of other applications which require a supply of relatively large quantities of adhesive.

In order to meet the demands of these types of applications, apparatus have been commercialized such as disclosed, for example, in U.S. Pat. Nos. 3,792,801; 3,964,645; and 4,200,207, each of which is assigned to the assignee of this invention. Apparatus of this general type consist of a hopper having an open top for receiving solid hot melt adhesive, and a heated grid positioned at the bottom of the hopper which operates to melt the solid adhesive and allow it to flow in liquid form into a container or reservoir. A heated pump is located internally of the liquid reservoir through which the melted hot melt adhesive is pumped via a heated conduit and heated dispenser to the surface to be bonded When using apparatus of the type described above, individual bars of hot melt adhesive are dumped into the open hopper periodically during a production run. Accordingly, the hot melt adhesive in the hopper is exposed to the atmosphere for a period no less than the time required to melt the adhesive, and may be exposed for many hours if the equipment is used intermittently. Although exposure to the atmosphere does not affect some types of hot melt adhesives, the performance and bonding characteristics of reactable adhesives such as moisture curable hot melt adhesives are adversely affected by contact with atmosphere prior to use. It is necessary to maintain such adhesives in an inert atmosphere such as within a moisture-proof container, and provide for dispensing from the container immediately prior to use, to ensure optimum performance of such adhesives. The prior art apparatus described above are thus unsuitable for dispensing rapidly degradable reactive adhesives.

Hot melt adhesive melting and dispensing systems particularly adapted for handling reactable, moisture curable hot melt adhesives have been proposed, and one system is disclosed in U.S. Pat. No. 4,586,636. In systems of this general type, the moisture curable hot melt adhesive is stored and shipped in bulk within moisture-proof, thermally conductive containers. The containers are formed with an externally threaded neck at one end having a discharge outlet, and a closure seal at the opposite end. The closure seal contacts the hot melt adhesive and is axially movable within the interior of the container toward the neck.

The apparatus disclosed in Pat. No. 4,586,636 for melting and discharging the moisture curable adhesive from the container includes a thermally conductive platen formed with a throughbore having internal threads adapted to mate with the neck of the container. The platen is mounted upon a heating block having heating elements for raising the temperature of the platen. The container is mounted on the top surface of the platen by threading its neck into the throughbore of the platen, and affixing a clamp to the base of the container.

The platen is heated by the heating block to a temperature which melts the adhesive at the end of the container resting on the platen. A piston-actuated ram then contacts the closure seal at the opposite end of the container, and moves it axially within the interior of the container to force the molten adhesive through the discharge outlet of the neck. The molten adhesive flows from the container outlet into the throughbore of the platen, and then through an outlet passageway formed in the heating block. The outlet passageway is connected to one or more dispensers which apply the adhesive to a substrate.

The ram continues its axial movement toward the neck of the container until all of the adhesive is discharged and the container is empty. Any drippage of adhesive which occurs in the course of replacing an empty container with a full one is caught by a tray interposed between the heating block and platen.

There are a number of problems with apparatus of the type disclosed in Pat. No. 4,586,636 which limit their effectiveness and ease of use. One problem relates to a failure to thermally isolate the adhesive from variations in the temperature of the platen and heating block. As disclosed in the 4,586,636 patent, for example, the heating block is directly mounted to the thermally conductive platen with no insulation or other means of thermally isolating the adhesive flowing through the outlet passageway of the heating block to the adhesive dispensers. Failure to thermally insulate the adhesive flowing into the outlet passageway of the heating block subjects the adhesive to temperature fluctuations of the heating block and platen which can occur during the course of a production run. As a result, the hot melt adhesive passing through the outlet of the heating block to the dispensers can become charred or too viscous for application to the substrate.

Another problem with apparatus such as disclosed in U.S. Pat. No. 4,586,636 involves the inefficient transfer of heat to the stream of adhesive as it flows through the discharge opening in the neck of the container into the throughbore in the platen.

The throughbore in the platen which receives the neck of the container forms a single, large passageway having a diameter approximately equal to the diameter of the neck of the container. When the apparatus is shut down, or operated intermittently, the adhesive within the throughbore of the platen cools as the platen temperature is decreased. A slug of viscous or semi-solid adhesive can thus be formed in the throughbore of the platen which must be heated upon start up of the apparatus. Unfortunately, the large diameter annular wall formed by the passageway in the platen contacts only the outermost portion of the slug of hot melt adhesive. The interior portion of the slug does not directly contact a heated surface and can pass through the heating block to the dispensers without being uniformly heated to the proper temperature.

Another problem with apparatus of the type described above relates to spillage or drippage of hot melt adhesive in the course of removing an empty container from the platen. The 4,586,636 patent, for example, discloses a spillage tray intended to catch such drippings which is positioned between the platen and heating block. This tray protects only the heating block from spillage and allows adhesive to drip onto the top of the platen located immediately beneath the container neck as it is removed from the platen. A buildup of excess adhesive on the platen reduces the heat transfer efficiency between the platen and container, and presents difficult cleaning problems.

SUMMARY OF THE INVENTION

It is therefore among the objectives of this invention to provide an apparatus for dispensing reactable hot melt adhesive from a sealed container which provides for the uniform transfer of heat to the hot melt adhesive discharged from the container, which maintains the hot melt adhesive at substantially constant temperature prior to discharge to a dispenser and which prevents drippage of adhesive in the course of replacing an empty container with a full one.

These objectives are accomplished in an apparatus comprising a housing, a manifold mounted within the housing and a platen mounted atop the manifold. An annular ring pivotally mounted within the housing is adapted to support a sealed container filled with reactable hot melt adhesive so that the neck of the container seats within an inlet formed in the platen. Heating elements in the platen rapidly melt the hot melt adhesive within the container for discharge through a number of spaced passageways in the platen. Each of the passageways has an elongated wall which contacts a portion of the adhesive stream to ensure the uniform transfer of heat throughout the stream.

The molten hot melt adhesive flows from the platen to a gear pump carried in the manifold which pumps the material to a dispenser. The platen is thermally insulated from the manifold and gear pump so that the hot melt adhesive within the manifold is isolated from the temperature fluctuations of the platen. Once the hot melt adhesive is completely discharged from a container, a drippage collection assembly mounted to the annular ring prevents drippage of hot melt adhesive onto the platen or manifold in the course of replacing an empty container with a full container.

In the preferred embodiment, the platen is designed to ensure efficient transfer of heat to the solid hot melt adhesive within the container and the stream of molten hot melt adhesive discharged from the neck of the container. Preferably, the upper surface of the platen is convex in shape to mate with a concave end of the container formed with the neck. The platen is provided with a number of high energy heating elements operable to heat the platen for the rapid melting of the adhesive within the container.

The inlet of the platen which receives the neck of the container is connected to a cylindrical flange extending outwardly from the base of the platen. The flange is formed with a plurality of spaced passageways which define flow paths for the molten hot melt adhesive flowing from the container into the platen. Each of these passageways has an elongated cylindrical wall which provides a heat transfer surface over which a portion of the stream of molten hot melt adhesive passes prior to introduction into the manifold. A relatively large surface area is therefore provided to ensure the transfer of heat uniformly throughout the stream of molten hot melt adhesive discharged from the container.

Depending upon the quantity of hot melt adhesive required, and whether or not the apparatus herein is operated intermittently, the temperature of the heating elements in the platen is adjustable by means of a power control system to melt more or less of the adhesive within the container. During periods of high demand, the temperature of the heating elements exceeds the application temperature of the hot melt adhesive for rapid melting thereof. In periods of low demand or sustained idle time, the power control system is operable to reduce the power input to the heating elements which allows dissipation of heat from the low mass platen. In accordance with the present invention, the temperature fluctuations of the platen are thermally isolated from the molten hot melt adhesive within the manifold and gear pump to maintain the hot melt adhesive at substantially constant temperature.

In the preferred embodiment, this thermal isolation is accomplished by providing an air gap between the platen and manifold except for four spacers at the corners of the platen and a central spacer between the flange at the base of the platen and an annular ring forming the adhesive inlet of the manifold. Preferably, the corner spacers are thermally isolated from the platen and manifold by heat insulating washers located at each end thereof. An insulated sleeve forms the central spacer which is fitted over the flange at the base of the platen and the annular ring of the manifold. Thermally non-conductive O-rings are positioned between the insulated sleeve, and the flange and annular ring, to limit the heat transfer between the platen and manifold. As a result, the wide temperature fluctuations of the platen are not transmitted to the hot melt adhesive within the manifold and gear pump.

In the preferred embodiment, the annular ring for supporting the container is pivotally mounted to a vertical rod carried within the housing. The annular ring supports the container on end, and positions it within the housing so that the neck of the container is disposed immediately above the inlet of the platen. A spring-biased centering cap fits over the end of the container opposite its neck and urges the container into engagement with the facing surface of the platen. Melted hot melt adhesive is discharged through the neck of the container by a ram, driven by a piston carried by the housing, which is movable axially along the interior of the container toward the neck.

Once all of the hot melt adhesive is discharged from the container, the ram is withdrawn and the neck of the container is removed from the inlet of the platen. The empty container is then ready for removal from the housing and for replacement by a new container. The structure for removing the container from the housing comprises a lever pivotally mounted to the annular ring having a handle at one end and a holder at the opposite end which mounts a cup.

In order to remove an empty container from the housing, the handle of the lever is grasped and pulled in a direction outwardly from the housing until it engages a stop mounted to the annular ring. Outward movement of the handle end of the lever pivots the opposite end of the lever inwardly to position the holder and cup immediately beneath the neck of the container. Any drippage of hot melt adhesive from the empty container is caught by the cup preventing it from reaching the components of the unit beneath. The lever is then pulled further outwardly against the stop which pivots the annular ring about the vertical rod to move the container outside of the housing for replacement. The operation is reversed to insert a new container into the housing.

DESCRIPTION OF THE DRAWINGS

The structure, operation and advantages of the preferred embodiment of this invention will become further apparent upon consideration of the following description taken in conjunction with the accompanying drawings, wherein:

FIG. 3 is a view in partial cross section of the support ring and drip catching element herein taken generally along line 3—3 of FIG. 1;

FIG. 5 is a partial view of the platen taken generally along line 5—5 of FIG. 4.

DETAILED DESCRIPTION OF THE INVENTION

Figure 1:
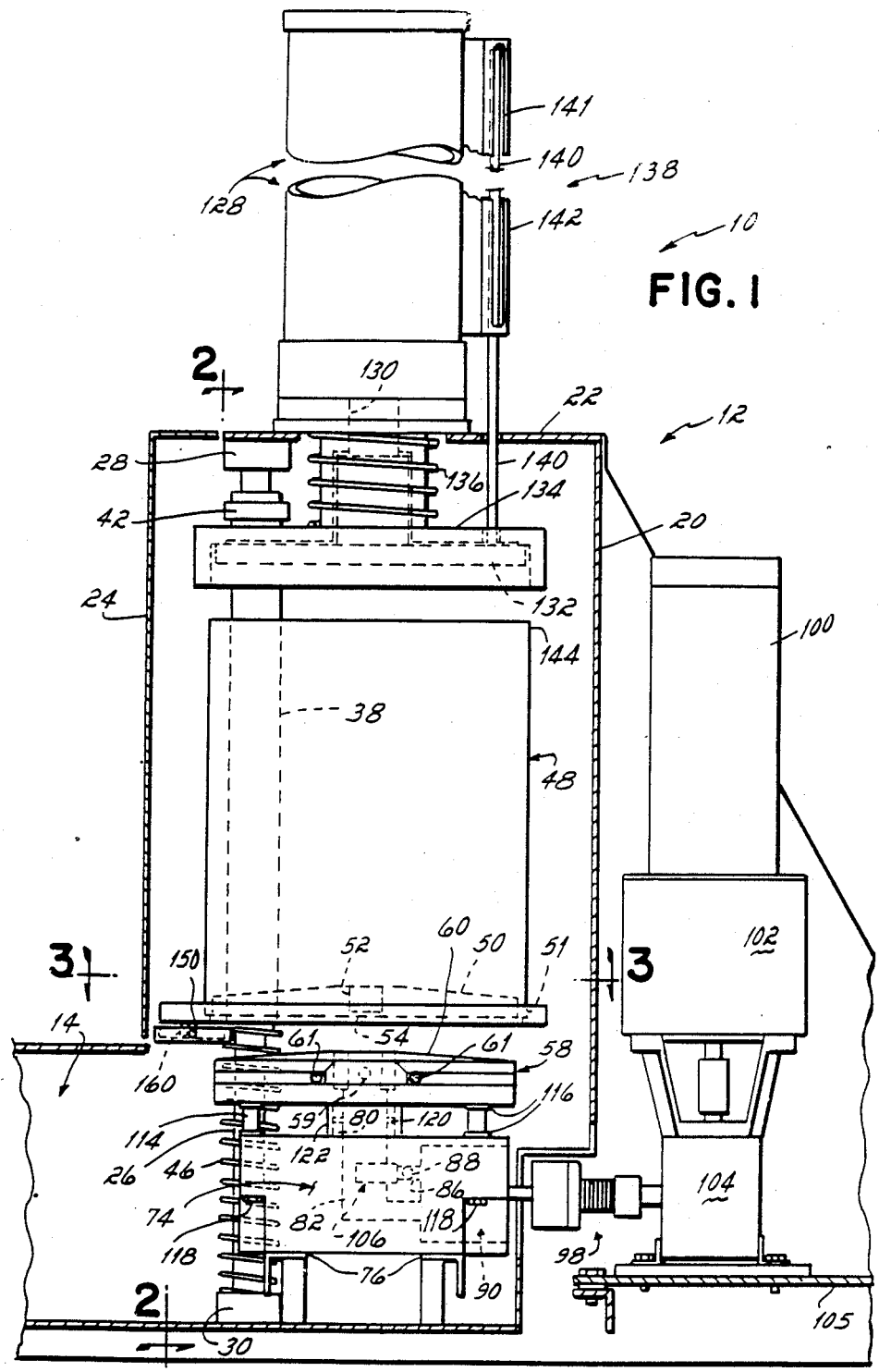
FIG. 1 is a side view in partial cross section of the apparatus of this invention.
Figure 2:
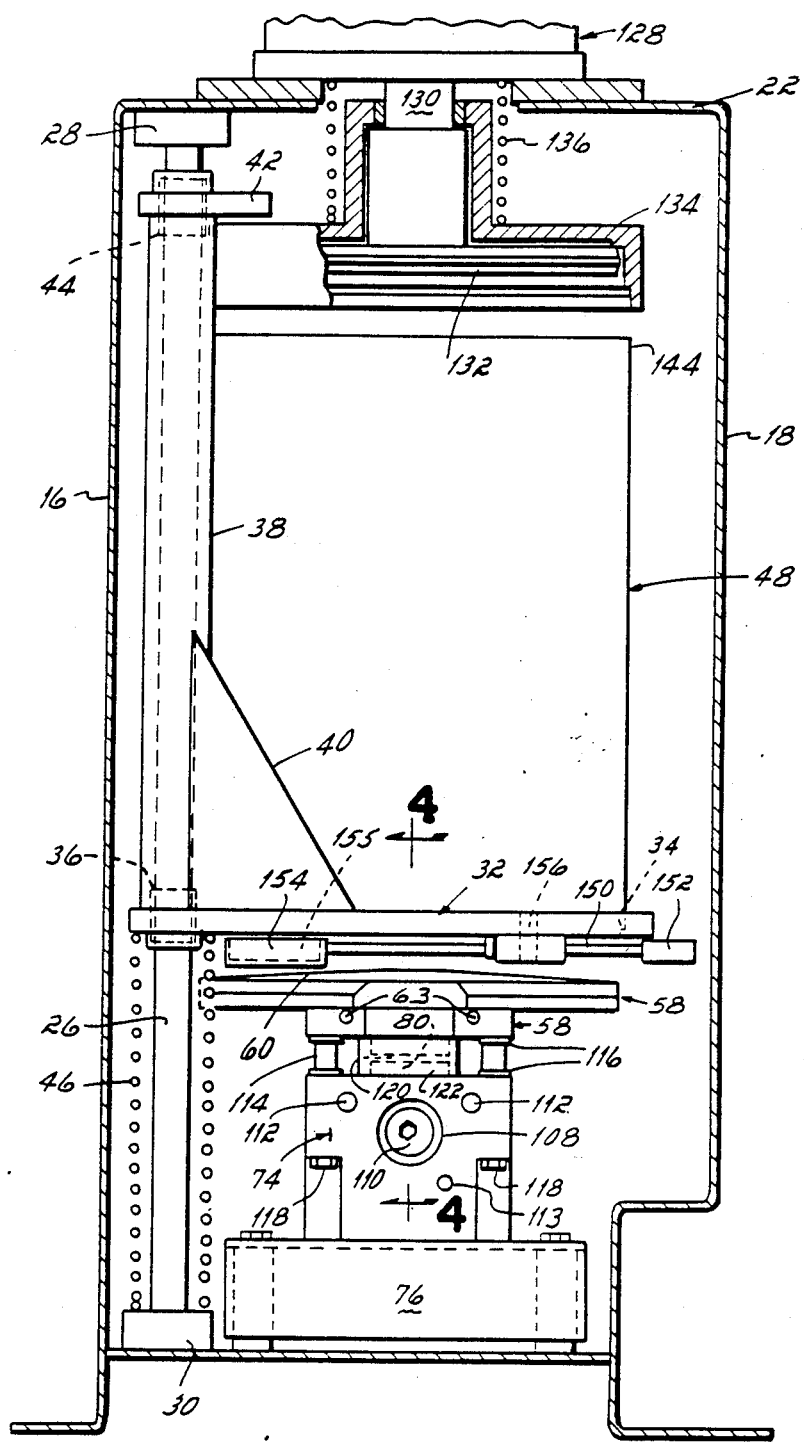
FIG. 2 is a front view of the apparatus in partial cross section taken generally along line 2—2 of FIG. 1.

Referring now to FIGS. 1 and 2, the apparatus 10 of this invention includes a housing 12 having a base 14 and an upper section formed by sidewalls 16, 18, a back wall 20, a top wall 22 and a hinged door 24. A vertical rod 26 is mounted within the housing 12 between the top wall 22 and base 14 by a pair of flanges 28, 30.

An annular ring 32 formed with a shoulder 34 is pivotally and slidably mounted to the vertical rod 26 by a sleeve bearing 36. As shown in FIG. 3 and discussed in detail below, the annular ring 32 is pivotal between a dispensing position within the interior of housing 12 and a load position outside of the housing 12. The upper portion of support rod 26 receives a sleeve 38 which rests atop the annular ring 32 and is mounted thereto by a pair of angles 40, only one of which is shown in the Figs. A stop 42 is mounted to the top end of sleeve 38, and a sleeve bearing 44 pivotally and slidably mounts the stop 42 to the vertical support rod 26. The lower portion of the support rod 26 receives a ring support spring 46 which extends between the flange 30 and the underside of the annular ring 32.

The annular ring 32 is adapted to support a thermally conductive, moisture-proof container 48 filled with moisture curable hot melt adhesive. The container 48 is generally cylindrical in shape, having a concave lower end 50. The lower end 50 is formed with a rim 51 and an outwardly projecting neck 52 having a discharge outlet 54. The rim 51 is adapted to seat within the shoulder 34 formed in the annular ring 32 to support the container 48 on end in a vertical position within the housing 12. As illustrated in FIG. 1, the spring 46 supports the entire weight of the annular ring 32 and container 48.

Figure 4:
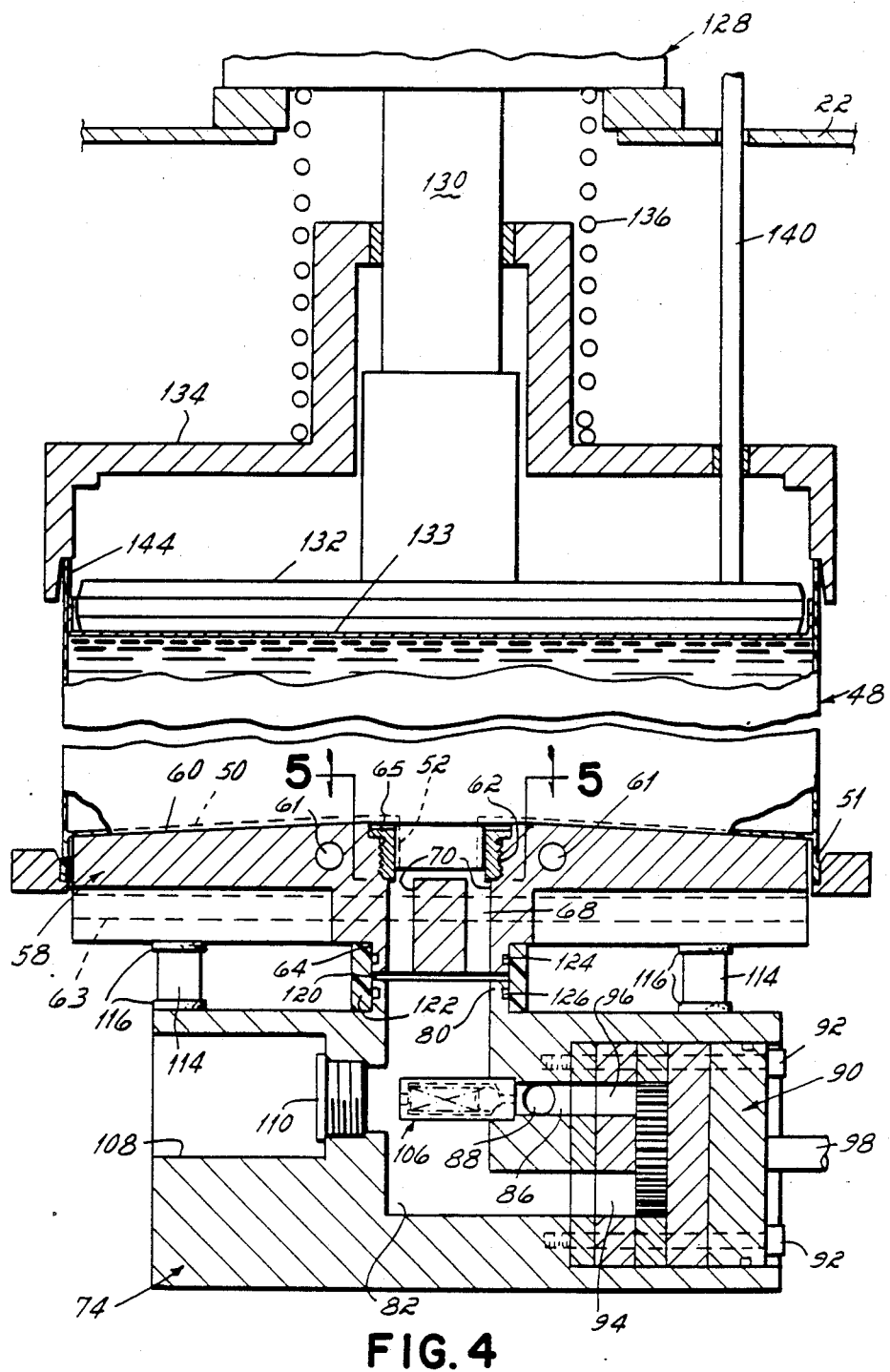
FIG. 4 is an enlarged view in partial cross section of the platen, manifold, ram, and centering cap elements of this invention.

Referring now to FIGS. 1, 2 and 4, the structure for melting the hot melt adhesive within the container 48, and for pumping the melted adhesive to dispensers, is illustrated in detail. A platen 58 is mounted in the housing 12 immediately beneath the container 48 and annular ring 32, in a manner discussed in detail below. The platen 58 is a relatively thin, highly thermally conductive plate having a convex top surface 60 adapted to mate with the concave lower end 50 of container 48. The platen 58 is heated by a first set of heating elements 61, which, in the preferred embodiment, extend at right angles to a second set of heating elements 63 within the platen 58. The heating elements 61, 63 are operated by a power control system (not shown) of the type disclosed in U.S. Pat. No. 4,547,657, owned by the assignee of this invention, which is incorporated by reference in its entirety herein. The power control system is operable to energize the heating elements 61, 63 which heat the platen 58 to temperatures sufficient to melt the hot melt adhesive within the container 48 and maintain at least a portion of the adhesive at the concave lower end 50 molten. In periods of sustained idle time, the power control system is operable to reduce the power supplied to the heating elements 61, 63 thus allowing the platen 58 to cool to temperatures below the application temperature of the adhesive within container 48. Preferably, the platen 58 includes one or more temperature sensors 59 to permit monitoring of the platen temperature.

The platen 58 is formed with a stepped inlet bore 62 which extends inwardly from the convex top surface 60 partially into the interior of the platen 58. The stepped inlet bore 62 mounts an adaptor 65 which mates with the neck 52 of container 48 to receive the melted hot melt adhesive therefrom. The platen 58 is also formed with a cylindrical hub 64. The cylindrical hub 64 is connected to the inlet bore 62 and extends downwardly from the bottom surface of platen 58. As shown in FIG. 5, the cylindrical flange 64 is formed with six circumferentially spaced throughbores 68. Each of the throughbores 68 has an elongated inner wall 70 which contacts a portion of the stream of melted adhesive ejected from the container 48. Together, the inner walls 70 of through-bores 68 provide a substantial area of contact with the stream of hot melt adhesive to ensure efficient and uniform transfer of heat throughout the stream.

The platen 58 is mounted within the housing 12 atop a manifold 74 which is supported within the base 14 of the housing 12 by two mounting brackets 76. The manifold 74 is formed with an adhesive inlet defined by a ring 80 extending upwardly from the top surface of manifold 74. The adhesive inlet is connected to a chamber 82 formed within the interior of the manifold 74. The manifold 74 is also formed with an internal passageway 86 connected to an outlet 88 leading to adhesive dispensers (not shown) located exteriorly of the manifold 74.

As shown in FIGS. 1 and 4, a gear pump 90 is mounted within the manifold 74 by bolts 92. The details of construction of gear pump 90 forms no part of this invention. The gear pump 90 includes a low pressure inlet 94 connected to the chamber 82, and a high pressure outlet 96 connected to the internal passageway 86. The gear pump 90 is driven by a drive shaft 98, which, in turn, is driven by a motor 100 connected to the drive shaft 98 through a clutch 102 and a gear reducer 104 supported by a base 105. The gear pump 90 is operable to receive hot melt adhesive from the chamber 82 at its low pressure inlet 94, and pump the heated hot melt adhesive out its high pressure outlet 96 into the internal passageway 86.

As illustrated in FIG. 4, a one-way, pressure relief valve 106 is positioned in the internal passageway 86 of manifold 74 downstream from the outlet 88. The details of construction of pressure relief valve 106 constitute no part of the present invention. The pressure relief valve 106 is mounted in position within passageway 86 through a stepped access bore 108 formed in the manifold 74 which is closed by a plug 110.

Under normal operating conditions, as described below, hot melt adhesive is pumped from the high pressure outlet 96 of gear pump 90 through the internal passageway 86 and into the outlet 88 for supply to adhesive dispensers. In the event the dispensers are shut down or operated intermittently, the gear pump 90 also shuts off to interrupt or discontinue the flow of adhesive, as required. The pressure relief valve 106 is provided as a backup, safety device to redirect adhesive flow in case the gear pump 90 fails to shut off or some other problem occurs. If the pressure with the internal passageway 86 reaches a predetermined level, the pressure relief valve 106 opens to permit passage of adhesive from internal passageway 86 into the chamber 82. The adhesive is then directed back to the low pressure inlet 94 of the gear pump 90. This recirculation of the adhesive from the high pressure outlet 96 to the low pressure inlet 94 of the gear pump 90 is accomplished internally of the manifold 74 for safety purposes and to prevent exposure of the hot melt adhesive to atmosphere which could result in charring of the adhesive. When the pressure within internal passageway 86 returns to normal, the pressure relief valve 106 closes and the adhesive then flows through the outlet 88.

The manifold 74 is provided with electric heating elements 112, as shown in FIG. 2, to maintain the melted hot melt adhesive within the manifold 74 at a substantially constant temperature. A temperature sensor 113 is mounted in the manifold 74 to permit monitoring of the temperature thereof. The platen 58, however, is subject to widely varying fluctuations in temperature by operation of its heating elements 61, 63. For example, in order to initially melt the moisture curable hot melt adhesive within a new container 48, the temperature of platen 58 is increased to a level beyond the melt temperature of the adhesive for rapid melting thereof. The platen 58 may also be maintained at high temperatures during periods of high demand for the hot melt adhesive to ensure sufficient quantities are supplied to the dispensers. In periods of no demand for the adhesive, the temperature of the heating elements 61, 63 of platen 58 may be reduced below the melt temperature of the adhesive. Such temperature fluctuations of the platen 58 must be isolated from the manifold 74 so that the temperature of the hot melt adhesive within the manifold 74 is maintained substantially constant. This ensures that the adhesive retains its desired bonding properties.

Thermal isolation between the platen 58 and manifold 74 is achieved with the structure illustrated in FIG. 4. The platen 58 is supported upon the manifold 74 by four spacers 114, two of which are illustrated. The spacers 114 provide an air gap between the platen 58 and manifold 74. Washers 116 are provided at the ends of each of the spacers 114 which contact the platen 58 and manifold 74. The washers 116 have a relatively small surface area to limit the transfer of heat between the platen 58 and manifold 74. Preferably, the spacers 114 are hollow cylinders and each receive a mounting screw 118 which extend from the manifold 74 into the platen 58 to maintain them in assembled relation. See FIG. 2.

As also shown in FIG. 4, a gap 120 is provided between the cylindrical hub 64 of platen 58 and ring 80 of manifold 74 to limit heat transfer therebetween. In addition, a cylindrical, insulated sleeve 122 extends between the platen 58 and manifold 4 which encircles the aligning cylindrical hub 64 and ring 80. A fluid seal is formed between the sleeve 22 and the cylindrical hub 64, and between the sleeve 22 and ring 80, by a pair of thermally insulated O-rings 124, 126, respectively.

Referring now to the top portion of FIGS. 1, and 4, the structure for discharging the moisture curable hot melt adhesive from the container 48 is illustrated. A cylinder 128 having a piston 130 is carried by the top 22 of housing 12. The outer end of the piston 130 is connected to a ram 132 movable axially within the container 48. The ram 132 is disposed within an annular centering cap 134 which is biased toward the container 48 by a hold-down spring 136.

Adhesive is dispensed from the container 48 as follows. Initially, the hold-down spring 136 forces the centering cap 134 into engagement with the top rim 144 of the container 48. The centering cap 134 ensures that the container 48 is properly aligned with the platen 58. The piston 130 is then extended to force the ram 132 against a closure seal 133 which contacts the adhesive at the top of the container 48. Axial movement of the ram 132 against the closure seal 133 in the container 48, and the force of the holddown spring 136 against the centering cap 134, forces the neck 52 of the container 48 into the inlet bore 62 of the platen 58 and maintains the concave lower end 50 of container 48 against the convex top surface 60 of platen 58. The hot melt adhesive within the container 48 is melted by the platen 58, as described above. Further downward movement of the ram 132 against the closure seal 133 forces the melted hot melt adhesive at the lower end 50 of the container 48 outwardly through the discharge outlet 54 in the container neck 52 and into the inlet bore 62 of the platen 58. The stream of melted adhesive then flows through the throughbores 68 in the plate 58 from which it is ejected into the chamber 82 of manifold 74.

In the preferred embodiment, a level measuring device 138 is provided to monitor the amount of adhesive within container 48. The level measuring device 138 comprises a lower rod 140 mounted to the ram 132 which is axially movable within an upper sleeve 142 fixed to the cylinder 128. The top of the lower rod 140 aligns with indicia 141 marked on the upper sleeve 142 which corresponds to the quantity of adhesive within container 48.

Once all of the hot melt adhesive has been dispensed from the container 48, it must be removed from the housing 12 for replacement by a new container. Referring now to FIGS. 2 and 3, structure is illustrated for removing an empty container 48 from the housing 12 without drippage onto the platen 58 or manifold 74. A lever 150 having a handle 152 at one end and a holder 154 at the opposite end is pivotally mounted to the annular ring 32 at pivot 156. The holder 154 is adapted to support a paper or plastic cup 155. The level 150 is pivotal with respect to the annular ring 32 between an inner stop 158 and an outer stop 160, both of which are mounted to the annular ring 32.

After the adhesive has been dispensed from container 48, the ram 132 is withdrawn from the interior of the container 48. In the course of retracting the piston 130, the ram 132 contacts the centering cap 134 which unseats from the top rim 144 of the container 48. Further retraction of the piston 130 causes the centering cap 134 to engage the stop 42 mounted to sleeve 38. In turn, the annular ring 32 moves upwardly with the sleeve 38 to force the neck 52 of container 48 out of engagement with the adaptor 63 of the platen 58. The spring 46 also assists in returning the annular ring 32 and container 48 to a position wherein the neck 52 of the container 48 is spaced above the platen 58. See FIG. 2. This provides sufficient clearance for the lever 150, and the drip-catching cup 155 carried by the holder 154, to move between the container 48 and the platen 58.

Movement of the lever 150 is obtained by pulling the handle 152 outwardly relative to the housing 12 which pivots the holder 154 and cup 155 inwardly. The lever 152 is pivoted until it engages inner stop 158 at which point the holder 154 and cup 155 are positioned directly beneath the discharge outlet 54 in the neck 52 of container 48. Any drippings or spillage from the container 48 are therefore caught in the cup 155.

The handle 152 is then pulled further outwardly against the stop 158 which pivots the annular ring 32 about the vertical rod 26, and moves the container 48 outside of the housing 12 as shown in phantom in FIG. 3. The empty container 48 is removed from the annular ring 32 and replaced by a new container in preparation for further operation of apparatus 10. A new cup 155 is also inserted within holder 154 at this time. The lever 150 is then pivoted in the opposite direction relative to the annular ring 32 until it engages outer stop 160. Further inward force on the lever 150 moves the ring 32 inside the housing 12 as the ring 32 pivots in the reverse direction about vertical rod 26. See the solid lines in FIG. 3. With the lever 150 in engagement with outer stop 160, the holder 154 and cup 155 are positioned at the outer edge of the annular ring 32, away from the neck 52 of container 48 and away from the platen 58.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. Apparatus for dispensing hot melt adhesive from a container having a neck formed with a discharge outlet, comprising:
   means for supporting the container;
   a platen mounted in a position to contact the container, said platen having means for heating said platen to melt the hot melt adhesive within the container;
   means for ejecting molten hot melt adhesive through the discharge outlet of the container;
   heat transfer means carried by said platen and communicating with the discharge outlet of the container for transferring heat from said platen to the hot melt adhesive discharged through the outlet of the container, said heat transfer means comprising a section of thermally conductive material formed with spaced passageways each having an elongated wall, said elongated walls each contacting a portion of the melted hot melt adhesive ejected from the container for transferring heat from said platen uniformly throughout the melted hot melt adhesive;
   pump means communicating with said spaced passageways for pumping the melted hot melt adhesive to a dispenser.

2. The apparatus of claim 1 in which said platen is a thermally conductive plate formed with an inlet adapted to mate with the neck of the container, said heat transfer means comprising a thermally conductive member connected to said inlet of said platen and surrounding said spaced passageways.

3. Apparatus for dispensing hot melt adhesive from a container having a neck formed with a discharge outlet, comprising:
   means for supporting the container;
   a manifold formed with an interior chamber and an inlet and outlet communicating with said interior chamber;
   a platen formed of thermally conductive material having heating elements associated therewith, said platen being formed with a passage having inlet adapted to mate with the neck of the container and an outlet spaced from said inlet;
   mounting means for mounting said platen to said manifold, said platen being mounted in a position to contact the container and interconnect the neck of the container with said platen, said platen being effective to melt the hot melt adhesive within the container, said platen being positioned relative to said manifold so that said outlet of said platen communicates with said inlet of said manifold;
   means for ejecting melted hot melt adhesive from the discharge outlet in the neck of the container, through said passage in said platen into said interior chamber of said manifold;
   insulation means interposed between said platen and said manifold for thermally insulating the melted hot melt adhesive in said interior chamber of said manifold from said platen.

4. The apparatus of claim 3 in which said mounting means comprises:
   hollow, annular spacers extending between the corners of said platen and said manifold;
   a bolt extending through each of said annular spacers, said bolts interconnecting said platen and said manifold;
   an insulated, cylindrical sleeve extending between said outlet of said platen and said inlet of said manifold.

5. The apparatus of claim 4 in which said platen is formed with an outwardly extending, cylindrical hub having at least one passageway defining said outlet of said platen, and said manifold is formed with an outwardly extending annular ring defining said inlet of said manifold, said insulated, cylindrical sleeve extending between and concentric to said cylindrical hub and said annular ring.

6. The apparatus of claim 5 in which said insulation means comprises:
   a washer interposed between one end of each of said annular spacers and said manifold, and between the opposite end of each said annular spacers and said platen;
   a first insulated O-ring interposed between said insulated, cylindrical sleeve and said cylindrical hub of said platen, and a second insulated O-ring interposed between said insulated, cylindrical sleeve and said annular ring of said manifold.

7. The apparatus of claim 3 further comprising:

pump means carried by said manifold for pumping hot melt adhesive through said outlet of said manifold to an adhesive dispenser, said pump means having a low pressure inlet communicating with said interior chamber and a high pressure outlet communicating with said outlet in said manifold; and pressure relief means connected between said interior chamber and said high pressure outlet of said pump means downstream from said outlet of said manifold, said pressure relief means being operable in the event of a pressure buildup within said outlet of said manifold to direct hot melt adhesive from said high pressure outlet of said pump means into said interior chamber.

8. Apparatus for dispensing hot melt adhesive from a container having an outlet at one end, comprising:

container support means for supporting the container, said container support means being pivot between a dispensing position and a loading position;

a platen mounted in a position to contact said container with said container located in said dispensing position, said platen having means for heating said platen to melt the hot melt adhesive within the container;

discharge means for discharging melted hot melt adhesive through the outlet of the container to empty the container;

collection means carried by said container support means for collecting hot melt adhesive from the outlet of an empty container while moving said container support means and the empty container supported thereon from said dispensing position to said loading position.

9. The apparatus of claim 8 in which said container support means comprises:

a vertical rod;

an annular ring formed with a shoulder adapted to support one end of the container;

a sleeve bearing mounted to said vertical rod, said sleeve bearing pivotally and slidably mounting said annular ring to said vertical rod;

a spring extending between the bottom of said annular ring and a support for positioning said annular ring and the container above said platen preparatory to operation of said discharge means.

10. The apparatus of claim 9 in which said container support means further includes a sleeve carried concentrically upon said vertical rod and mounted at one end atop said annular ring, said sleeve being mounted at the opposite end to a stop pivotally and slidably mounted to said vertical rod.

11. The apparatus of claim 9 in which said collection means comprises:

a lever having a handle at one end and a holder at the opposite end adapted to support a cup, said lever being pivotally mounted to said annular ring and movable between a collection position in which said holder and cup are positioned beneath the outlet of a container supported by said annular ring, and a neutral position in which said holder and cup are spaced from the outlet of a container supported by said annular ring.

12. The apparatus of claim 11 in which said annular ring mounts an inner stop and an outer stop, said inner stop being engageable with said lever upon movement thereof to said collection position and said outer stop being engageable with said lever upon movement thereof to said neutral position.

13. The apparatus of claim 9 in which said discharge means comprises:

a ram axially movable within the interior of the container toward the outlet of the container;

piston means connected to said ram for axially moving said ram toward the outlet of the container to force melted hot melt adhesive through the outlet of the container;

a centering cap adapted to mount over the end of the container opposite the outlet;

spring means engaging said centering cap for urging the container against said platen, said spring mean shaving a spring force greater than the spring force of said spring extending between said annular ring and said support to maintain the container in engagement with said platen.

14. The apparatus of claim 13 further including an adhesive level indicator operatively connected to said ram, said adhesive level indicator providing a reading of the quantity of hot melt adhesive discharge from the container in response to axial movement of said ram within the interior of the container.

15. Apparatus for dispensing reactable hot melt adhesive from a moisture-proof, sealed container having a neck formed with a discharge outlet, comprising:

means for supporting the container;

a manifold formed with an interior chamber having an inlet, said manifold having heating elements associated therewith;

a platen having heating elements associated therewith, said platen being formed with a passage having an inlet adapted to mate with the neck of the container and an outlet spaced from said inlet;

mounting means for mounting said platen to said manifold so that said outlet of said platen communicates with said inlet of said manifold, said outlet of said platen comprising a hub formed with a plurality of elongated passageways, each of said passageways forming a flow path for melted hot melt adhesive between the discharge outlet of the neck of the container and said inlet of said manifold;

means for ejecting melted hot melt adhesive from the discharge outlet in the neck of the container, through said passage in said platen into said interior chamber of said manifold, the temperature of the melted hot melt adhesive being maintained substantially constant within said interior chamber by said heating elements associated with said manifold;

insulation means interposed between said platen and said manifold to thermally isolate the melted hot melt adhesive within said interior chamber of said manifold from said platen.

* * * * *

UNITED STATES PATENT AND TRADEMARK OFFICE
CERTIFICATE OF CORRECTION

PATENT NO. : 4,898,302

DATED : February 6, 1990

INVENTOR(S) : David J. Byerly et al.

It is certified that error appears in the above-identified patent and that said Letters Patent is hereby corrected as shown below:

In column 7, line 67, "manifold 4" should be --manifold 74--.

In column 8, line 1, "sleeve 22" should be --sleeve 122--.

In column 8, line 2, "sleeve 22" should be --sleeve 122--.

In column 8, line 4, "Figs. 1, and 4" should read --Figs. 1, 2 and 4--.

In column 8, line 34, "plate" should be --platen--.

In column 8, line 54, "level" should be --lever--.

In column 11, line 19, "pivot" should be --pivotal--.

In column 12, lines 20 and 21, "mean shaving" should be --means having--.

Signed and Sealed this

Fifteenth Day of October, 1991

Attest:

HARRY F. MANBECK, JR.

*Attesting Officer*  *Commissioner of Patents and Trademarks*